United States Patent [19]

Bauer

[11] Patent Number: 4,909,194

[45] Date of Patent: Mar. 20, 1990

[54] MODULAR POSITION CONTROLLER FOR VARIABLE VALVE TIMING

[75] Inventor: Thomas J. Bauer, Newport News, Willem N.J. Van Vuuren, James City; Danny O. Wright, Newport News, all of Va.

[73] Assignee: Siemens-Bendix Automotive Electronics L.P., Troy, Mich.

[21] Appl. No.: 383,382

[22] Filed: Jul. 20, 1989

[51] Int. Cl.$^4$ .............................................. F01L 1/34
[52] U.S. Cl. ................................................ 123/90.15
[58] Field of Search ............... 123/90.11, 90.15, 90.17, 123/90.31

[56] References Cited

U.S. PATENT DOCUMENTS 4,494,496  1/1985  Nakamura et al. ............... 123/90.15
4,517,934  5/1985  Papez ................................ 123/90.17

Primary Examiner—Willis R. Wolfe
Assistant Examiner—Weilun Lo
Attorney, Agent, or Firm—George L. Boller; Russel C. Wells

[57] ABSTRACT

A variable valve timing system utilizes a closed-loop control for controlling the valve phasing wherein the closed-loop control receives a command input from the engine ECU. The command input is a pulse width modulated waveform that is synchronized with engine TDC.

4 Claims, 3 Drawing Sheets

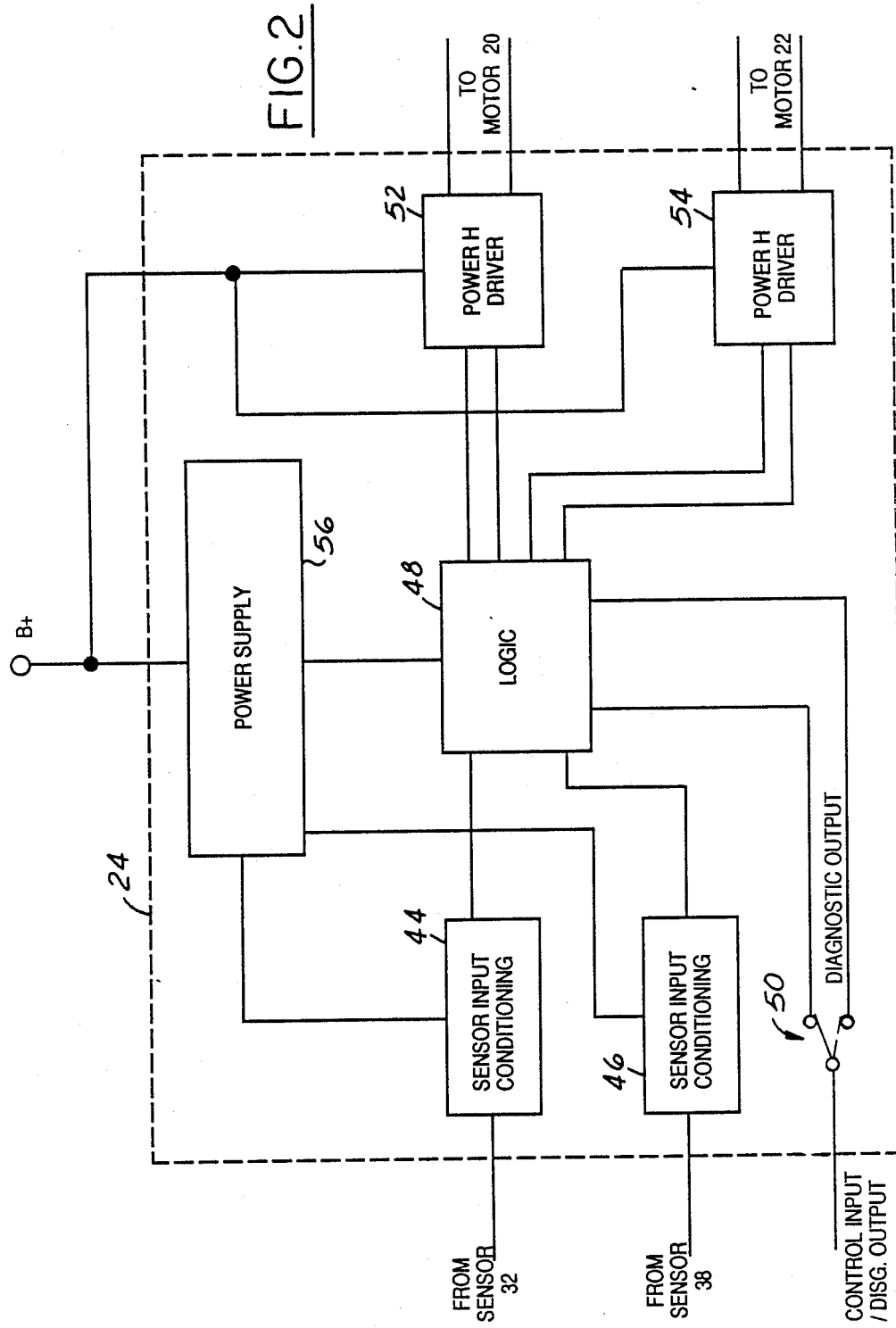

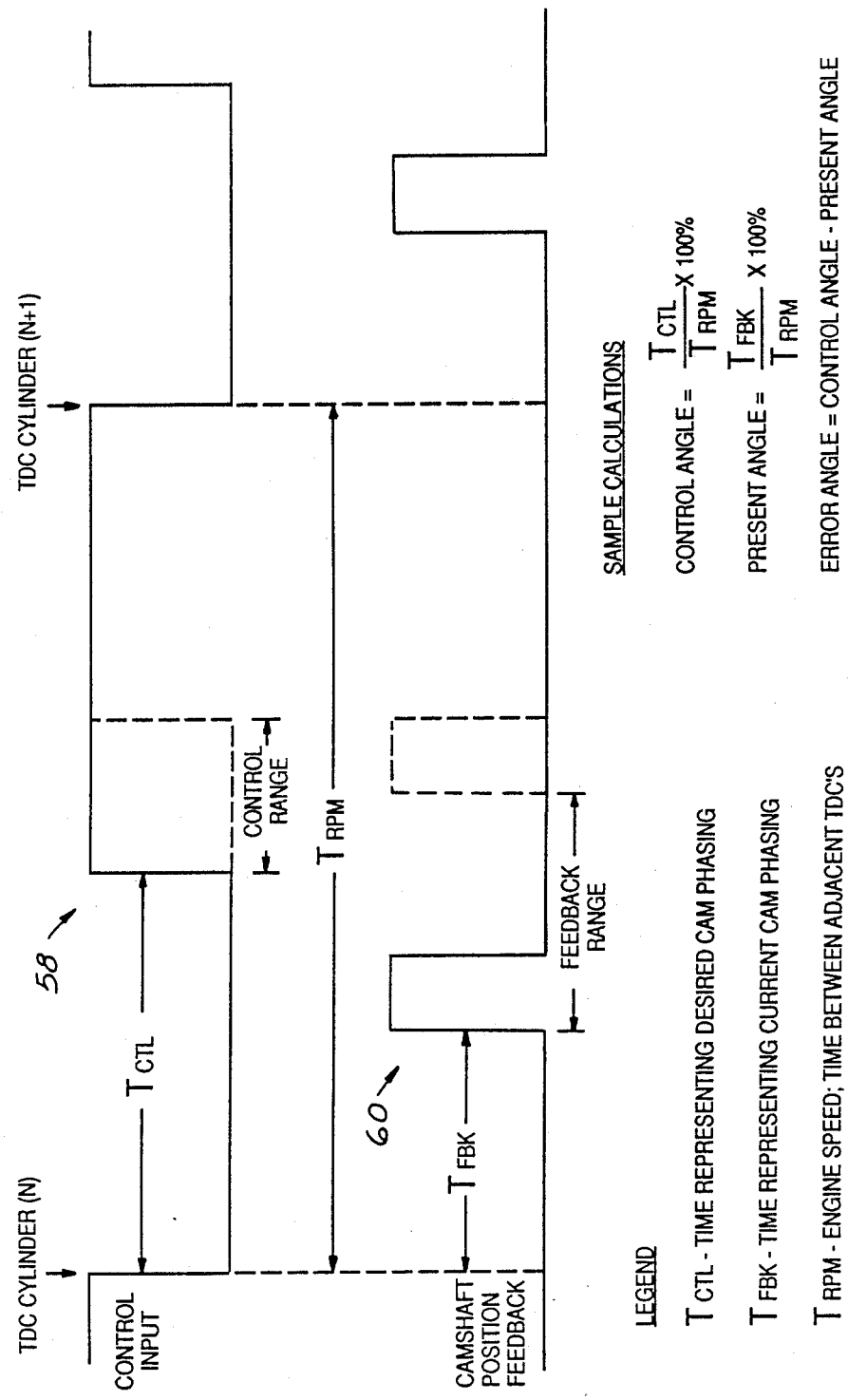

MODULAR POSITION CONTROLLER FOR VARIABLE VALVE TIMING

BACKGROUND AND SUMMARY OF THE INVENTION

This invention relates generally to internal combustion engines. More specifically, it relates to a system for controlling the timing, or phasing, of the valves of such engines.

The ability to adjust the timing of the intake and exhaust valves of internal combustion engines has been shown to improve engine performance. In an engine in which the intake and exhaust valves are operated mechanically by means of a camshaft that is driven by the engine crankshaft, the task of performing valve timing functions requires the use of a prime mover acting through a phasing mechanism on the camshaft to vary the phasing of the camshaft with respect to that of the crankshaft. Camshaft phasing is sensed by a sensor s that closed-loop control of the camshaft phasing can be obtained.

For optimum performance it has been found desirable for the valve timing function to be correlated with other engine timing functions. These other timing functions, such as fuel and ignition timing functions, are performed by the engine electronic control unit (ECU). The engine ECU typically contains a microprocessor that acts upon various inputs to calculate optimum values for fuel and ignition control functions. The engine ECU can also calculate the appropriate camshaft phasing, but if called upon to also exercise closed-loop control over the camshaft phasing, the typical engine ECU may lack sufficient power to do so. While a more powerful ECU could be employed, such a solution may not be the optimal one when all considerations relating to the mass production of various ECU-controlled engines are taken into account.

The present invention relates to a new and unique system for performing valve timing, or phasing, functions which avoids introducing complications into the engine ECU. The invention envisions a second ECU, hereinafter called a modular position controller (MPC), that is responsible for the active closed-loop control of valve timing, or phasing. Moreover, the invention contemplates that the operation of the MPC be correlated with that of the engine ECU by placing the PPC in communication with the engine ECU such that the engine ECU provides valve timing, or phasing, information to the MPC in a particular format. The MPC is capable of acting on this information to perform the closed-loop control of the valve timing.

In the disclosed embodiment where a camshaft phasing control is used, the ECU provides phasing information via a single wire, and this is an important advantage of the invention. In the disclosed preferred embodiment the information is provided as a rectangular waveform on this single wire. The waveform contains crankshaft position information, in the form of a top dead center (TDC) signal, and also a desired phasing for the camshaft. The rectangular waveform signal has the leading edge synchronized with TDC and the width of the pulse as measured from TDC corresponds to the desired camshaft phasing.

The foregoing features, advantages, and benefits of the invention, along with others, will be seen in the ensuing description and claims which should be considered in conjunction with the accompanying drawings. The drawings disclose a presently preferred embodiment of the invention in accordance with the best mode contemplated at this time for carrying out the invention.

BRIEF DESCRIPTION OF THE DRAWINGS

FIG. 2 is a schematic block diagram illustrating further details of a portion of one of the blocks of FIG. 1.

FIG. 3 is a diagram illustrating waveforms useful in explaining the operation of the system of the invention.

DESCRIPTION OF THE PREFERRED EMBODIMENT

Figure 1:
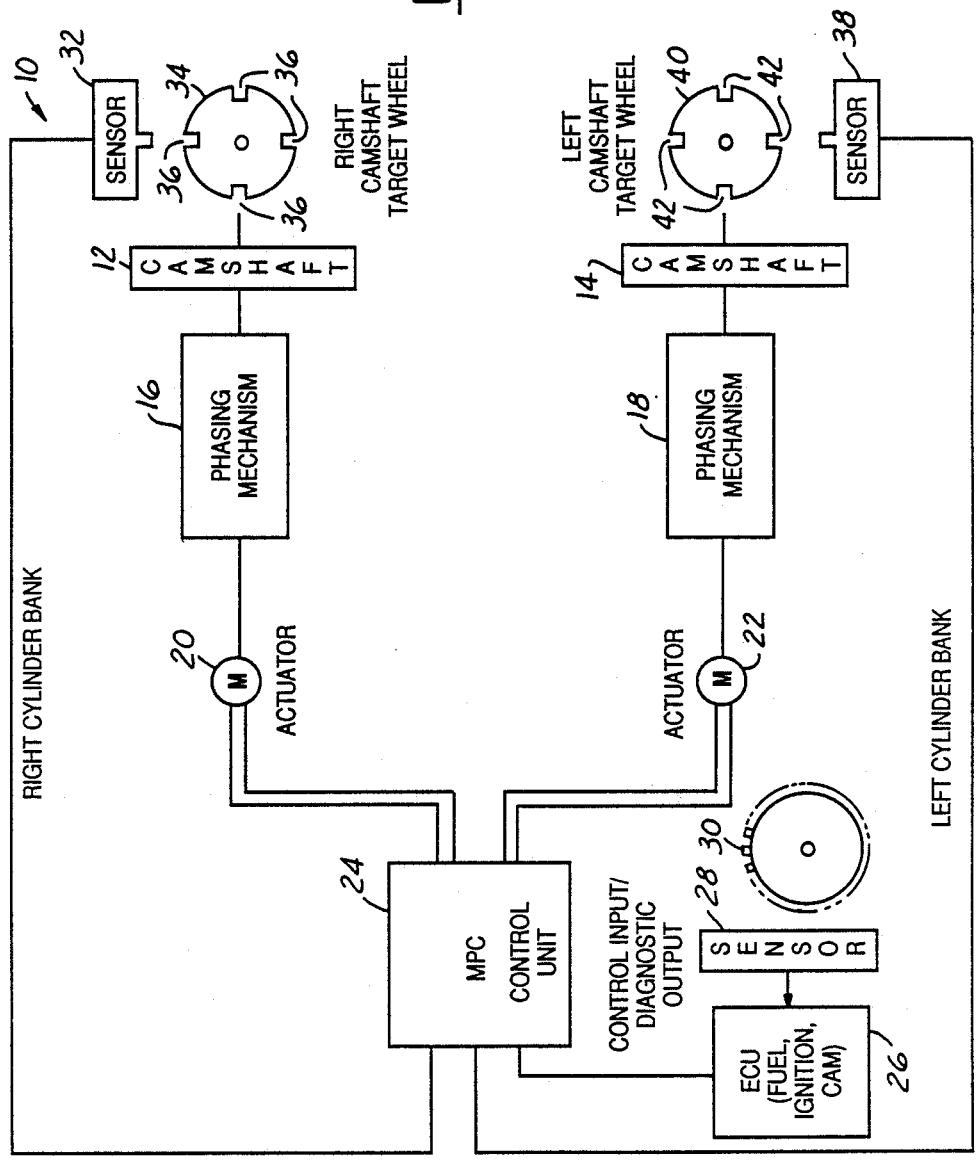
FIG. 1 is a schematic block diagram of an example of the modular position controller for variable valve phasing in accordance with principles of the invention.

FIG. 1 illustrates a modular position controller system 10 according to the present invention. The example that is represented by FIG. 1 is for a V-type engine in which there are right and left cylinder banks whose intake and exhaust valves are controlled by respective right and left camshafts 12 and 14 respectively. The phase of each camshaft in relation to that of the engine crankshaft is controlled by a corresponding phasing mechanism 16 and 18 respectively, and they are in turn operated by a corresponding actuator, or prime mover, 20 and 22 respectively. An example of the mechanism for performing the phasing of an engine camshaft can be found in various U.S. patents including, among others, U.S. Pat. No. 4,744,338, "Variable Camshaft Timing System" issued May 17, 1988 and commonly assigned.

The prime movers 20 and 22 are under the control of a modular position controller (MPC) control unit 24.

MPC 24 provides for the closed-loop control of the phasing of each camshaft 12 and 14 through a corresponding control loop. The command input to MPC 24 is from the engine ECU 26 that provides control over the fuel, ignition and cam phasing functions. ECU 26 receives an input signal from a sensor 28 that is associated with the engine crankshaft 30. The input signal provided by sensor 28 is an indication of engine top dead center (TDC) position. Closure of the loop associated with the right cylinder bank is by means of a sensor 32 that senses the phasing of the right camshaft 12 through a right camshaft target wheel 34 that rotates with the camshaft and is disposed in proximity to sensor 32. Where there are four cylinders in the right cylinder bank, the target wheel contains four notches 36 at equal intervals. In similar manner, the loop is closed around the left camshaft 14 by means of a sensor 38 that senses the left camshaft phase by means of a left camshaft target wheel 40 that is operated by the left camshaft. Where the left cylinder bank contains four cylinders, the left camshaft target wheel contains four notches 42 equally spaced. As the phase of each camshaft 12, 14 is changed by the corresponding phasing mechanism 16, 18, the phasing of the corresponding target wheel 34, 40 is similarly changed, and this is reflected in the signals supplied by the respective sensors 32, 38 to MPC 24.

FIG. 2 portrays the contents of MPC 24 in expanded detail. The exemplary MPC 24 comprises respective sensor input conditioning circuits 44, 46 that condition the inputs from the respective sensors 32, 38. The sensor input conditioning circuits 44, 46 condition the camshaft phase signals for application to a logic section 48 that comprises a microprocessor. The command signal from engine ECU 26 is also supplied as an input to logic section 48. The command input passes through a switch 50 that for diagnostic purposes can be operated to an alternate position, shown by broken lines in FIG. 2, which disconnects the command input from logic section 48 and in turn causes a diagnostic output signal from logic section 48 to appear at the command input.

Logic section 48 is programmed by conventional programming techniques to provide a PID function. This PID function stands for proportional, integral, derivative control. Proportional, derivative and integral control is a conventional practice in closed-loop type control systems for optimizing the response of the control loop. Specific details for any given controller will depend upon the transfer functions of the various components that are within the loop. Such values can be calculated using conventional closed-loop control theory.

Because logic section 48 does not have the ability to supply the required power levels for operating prime movers 20 and 22, MPC 24 further contains two power H driver circuits 52, 54 for respectively operating prime movers 20 and 22. The MPC still further comprises a power supply circuit 56 that derives from battery voltage suitable voltages for the various components of the MPC that have just been described.

In accordance with further principles of the invention, ECU 26 provides to MPC 24 the signals that are represented by the waveform 58 in FIG. 3. This is the command input, or control input, to the MPC that is based upon values calculated by the ECU for providing optimum valve timing in relation to other functions that are controlled by ECU 26.

The exemplary waveform 58 is a rectangular one in which one edge of the waveform corresponds to the crankshaft being in TDC position and the duty cycle corresponds to the desired camshaft phasing. In the waveform 58 of FIG. 3, the duty cycle is the ratio of $T_{ctl}$ to $T_{rpm}$. The portion of waveform 58 that is designated "control range" represents a typical control range over which the phasing of the camshaft may be adjusted.

FIG. 3 also shows a waveform 60 representative of the feedback from a target wheel. Each pulse of the waveform corresponds to passage of a notch 42 past the corresponding sensor. By itself, waveform 60 has no correlation with the crankshaft phasing. However, because MPC 24 receives TDC signal information from ECU 26, it knows the phasing of each camshaft by measurement of the distance of each camshaft pulse from top dead center in the corresponding waveform 60. The calculations that are portrayed in FIG. 3 show the relationship of the control angle, the feedback angle, and the error angle in terms of various portions of the waveforms 58 and 60.

It can now be appreciated that the engine ECU need provide only a simple control input signal, such as the waveform 58, to achieve variable valve timing control. In this way the incorporation of variable valve timing into an engine does not interfere in any significant way with the other engine control functions that are performed by the engine ECU.

While a preferred embodiment of the invention has been disclosed, it is to be appreciated that principles are applicable to other embodiments.

What is claimed is:

1. In an internal combustion engine that has pistons reciprocating within cylinders to drive a crankshaft and valves associated with the cylinders that are operated in timed relation to the crankshaft, an engine electronic control unit that control fuel and ignition functions of the engine, means for sensing engine TDC position, means for sensing the phasing of the operation of the engine valves and means including a prime mover for adjusting the phasing of said valves, the improvement which comprises a second electronic control unit for closed-loop controlling the prime mover to cause the phasing of operation of the valves to follow a desired phasing that is commanded by the first-mentioned electronic control unit, said second electronic control unit comprising an input receiving a feedback signal representing the actual phasing of the valve operation and a further input receiving a control waveform from the first electronic control unit wherein one portion of the control waveform corresponds to engine TDC position and another portion corresponds to the desired phasing of valve operation.

2. The improvement set forth in claim 1 in which the control waveform comprises a rectangular waveform wherein the leading edge of the rectangular waveform corresponds to engine TDC position and the duty cycle as measured from the edge thereof corresponding to engine TDC corresponds to the desired phasing of valve operation.

3. The improvement set forth in claim 1 in which the engine is a V-type engine that has two banks of cylinders each containing valves and wherein the second electronic control unit operates via a first prime mover and phasing mechanism for controlling the timing of one bank of valves and via a second prime mover and phasing mechanism for controlling the timing of the second bank of valves.

4. The improvement set forth in claim 1 in which the second electronic control unit comprises a logic section containing a microprocessor and wherein a control switch selectively disconnects said further input from said logic section so that said logic section can be monitored for diagnostic purposes.

* * * * *